(12) United States Patent
Ananolli

(10) Patent No.: US 7,896,588 B2
(45) Date of Patent: Mar. 1, 2011

(54) SHORT-HOLE DRILL AND A DRILL BODY THEREFOR

(75) Inventor: Raimo Ananolli, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 1105 days.

(21) Appl. No.: 11/584,758

(22) Filed: Oct. 23, 2006

(65) Prior Publication Data

US 2007/0092347 A1  Apr. 26, 2007

(30) Foreign Application Priority Data

Oct. 26, 2005  (SE)  .................................... 0502362

(51) Int. Cl.
*B23B 41/02* (2006.01)
*B23B 51/00* (2006.01)

(52) U.S. Cl. .................... 408/81; 408/229; 408/705; 408/713

(58) Field of Classification Search ............. 408/79–81, 408/83, 229, 705, 713; B23B 41/02, 51/00; B23D 77/00, B23D 77/02, 77/04
See application file for complete search history.

(56) References Cited

U.S. PATENT DOCUMENTS

| 1,362,871 | A | * | 12/1920 | Kelly | 408/200 |
|---|---|---|---|---|---|
| 3,348,434 | A | * | 10/1967 | Plummer | 408/83 |
| 3,961,857 | A | * | 6/1976 | Koblesky | 408/83 |
| 4,543,019 | A | * | 9/1985 | Shikata | 408/57 |
| 4,596,498 | A |   | 6/1986 | Kress |  |
| 4,666,350 | A | * | 5/1987 | Nicholas | 408/82 |
| 5,391,023 | A | * | 2/1995 | Basteck | 408/146 |
| 5,425,604 | A | * | 6/1995 | Scheer et al. | 408/83 |
| 5,791,838 | A | * | 8/1998 | Hamilton | 408/224 |
| 6,536,997 | B1 | * | 3/2003 | Kress | 408/1 R |
| 6,554,549 | B1 | * | 4/2003 | Kurz | 408/1 R |

FOREIGN PATENT DOCUMENTS

| DE | 2541423 A | * | 3/1977 |
| JP | 04075811 A | * | 3/1992 |
| JP | 2004-314258 |   | 11/2004 |
| SU | 638428 A | * | 12/1978 |
| SU | 1127704 A |   | 12/1984 |
| WO | WO 2005/095034 A1 |   | 10/2005 |

* cited by examiner

*Primary Examiner*—Eric A Gates
(74) *Attorney, Agent, or Firm*—Drinker Biddle & Reath LLP

(57) ABSTRACT

A short-hole drill, including a drill body being rotatable about a center axis and having a rotationally symmetrical envelope surface, one or more replaceable cutting inserts mounted in pockets in a front end of the drill body, one or more outwardly open flutes being countersunk in the envelope surface and extending rearwardly from the front end of the drill body to evacuate chips from the cutting inserts, and a number of replaceable first support pads being mounted in countersunk seats proximate the front end of the drill body to support and guide the drill against a hole wall generated by the cutting inserts. A number of second support pads are mounted in countersunk seats that are axially spaced apart from the first support pads by an envelope surface portion having a predetermined axial extension to support and guide the drill when the first support pads leave the hole wall.

8 Claims, 4 Drawing Sheets

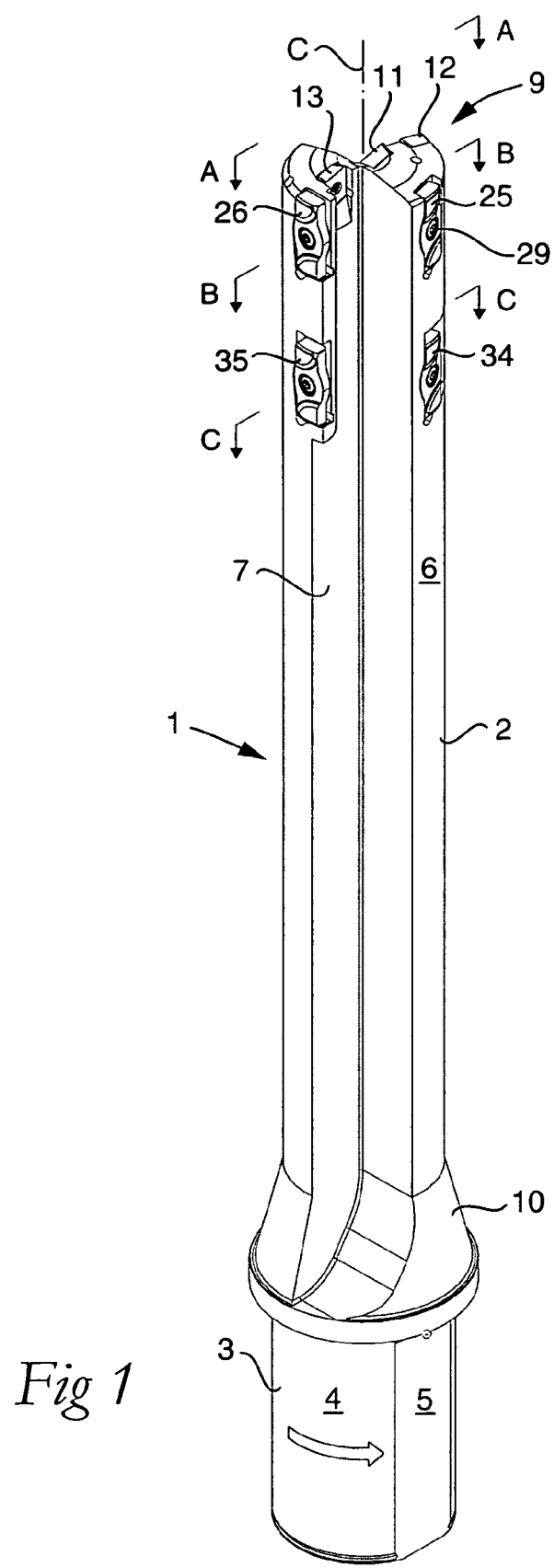

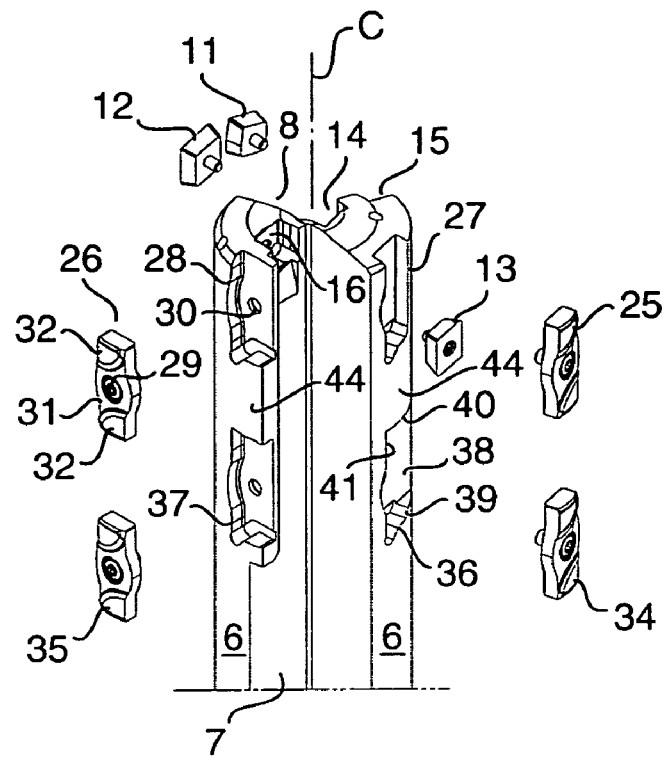

SHORT-HOLE DRILL AND A DRILL BODY THEREFOR

This application claims priority under 35 U.S.C. §119 to Sweden Patent Application No. 0502362-7, filed on Oct. 26, 2005, the disclosure of which is incorporated by reference herein in its entirety.

FIELD OF THE INVENTION

The present invention relates generally to a short-hole drill of the type that includes a drill body being rotatable about a center axis and having a rotationally symmetrical envelope surface, as well as one or more replaceable cutting inserts, which are mounted in pockets in a front end of the drill body, one or more outwardly open flutes being countersunk in the envelope surface and extending rearwardly from a front end of the drill body so as to evacuate chips from the cutting inserts, and a number of replaceable support pads being mounted in countersunk seats in the vicinity of the front end of the drill body in order to support and guide the drill against a hole wall generated by the cutting inserts. The invention also relates to a drill body for short-hole drills.

BACKGROUND OF THE INVENTION

Within the field of cutting or chip-removing machining of, above all, workpieces of metal, drilling of holes is a frequent operation. Generally, drilling may be divided into two different main disciplines, viz. short-hole drilling and long-hole drilling, respectively. Although these two disciplines have certain features in common, they are in practice completely different in many essential respects. As an old rule of thumb, short-hole drilling generates hole depths that amount to at most 5× the diameter, while long-hole drilling generates hole depths from 5× the diameter up to 100× the diameter, or more. In comparison with long-hole drilling, short-hole drilling may be carried out by means of tools and machines that are fairly uncomplicated, inexpensive and smoothly re-adjustable, in order to be able to provide a large number holes per unit of time, e.g., in one and the same workpiece. Usually, the necessary supply of cooling liquid to the cutting inserts of the drill takes place internally through the drill body from the machine, while the chip evacuation out of the drilled hole takes place via external, open flutes, which may be straight or helicoidal. In such a way, the drill and the workpiece can be readjusted quickly in relation to each other while minimizing the set-up times. In this connection, it should also be mentioned that short-hole drilled holes have a length that in absolute numbers rarely exceeds 300 mm.

Long-hole drilling differs from short-hole drilling not only in respect of the simple fact that the recessed holes have a great depth, but above all, of the fact that the depth of the holes imposes completely different and stiffer requirements on the requisite equipment in the form of machines, drills and fittings than the comparatively moderate requirements imposed on equipment for simple short-hole drilling. Thus, long-hole drilling is normally carried out in special long-hole drilling works, which are complicated and space-demanding, among other things, in order to allow any set of drill and workpiece according to three different alternatives, viz.: only rotating workpiece, only rotating drilling tool, or rotation of both the workpiece and the drilling tool. In the work, in addition to powerful driving and axial feeding mechanisms, sophisticated devices for the supply of cooling liquid, centering of the drill upon engagement, etc., are also included. In the dominant drilling systems, viz. STS (Single Tube System) and the Ejector system, the proper drill includes a tube and a replaceable front head, which is provided with asymmetrically placed cutting inserts and formed with an internal, through hole or bore through which released chips can pass to the interior of the tube for forwarding rearwardly to a collection device. In other words, in this case the chip evacuation takes place internally through the drill head and the tube, while the cooling liquid is fed forward externally along the drill head, viz. in the boundary layer between the envelope surface of the drill head and the hole wall. In this connection, the cooling liquid also serves as a lubricant between the hole wall and the drill. In order for the drill head to move straight, i.e., without deflecting from the ideally straight line defined by the center axis of the drill, the drill head includes particular support pads, which have the purpose of supporting and guiding the head against the action of such radial forces that are generated as a consequence of the asymmetrical placement of the cutting inserts in relation to the center axis. Furthermore, additional support pads may be arranged remotely behind the drill head, viz. either on a particular adapter between the drill head and the tube, or on the proper tube. The principal task of the trailing set or sets of support pads is to equalize occurring irregularities in the surface of the hole wall with the purpose of giving the hole wall an optimized surface finish.

It should also be mentioned that the workpieces machined by long-hole drilling frequently are very expensive, and hence any cassations become disastrous in respect of economy. For instance, the workpieces may be blanks for rolls, propeller shafts, etc., the length of which often exceeds 10 m, and the value of which, in the finish-machined state, at times approaches the value of the equipment by means of which the machining is carried out.

Furthermore, it should be pointed out that long-hole drills rarely or never are used for short-hole drilling according to the aforementioned rule of thumb. However, the development of such drills that traditionally relate to the group of short-hole drills has now been driven so far that they can be used for making holes that are deeper than 5× the diameter.

The present invention relates to a short-hole drill of the type initially mentioned, which is exclusively suitable and intended for short-hole drilling. Like long-hole drills, also certain types of short-hole drills are made with asymmetrically placed cutting inserts, the shank of the drills having been made with a single pair of support pads located in the area of the front end of the drill, viz. peripherally in the immediate vicinity of the front-end surface in which the cutting inserts and the pockets thereof are located. Such short-hole drills fulfill, in a profitable way, the task of drilling continuous holes in solid workpieces, more precisely by so-called solid drilling, wherein an unbroken hole wall is formed between the opposite ends of the hole. However, if the drill is to pass one or more hollow spaces inside a workpiece, e.g., when drilling crossing holes, the drill may lose its guiding and deflect when it passes the hollow space. When the drill tip in the next step, after having passed the hollow space, again should enter the material of the workpiece, there is a risk that the entering takes place at a point that deviates from the geometrical center line that defines an optimally straight hole. In other words, the straightness and dimensional accuracy of the hole may be spoiled-something that in the worst case may lead to cassation of the workpiece.

As an example of a short-hole drill according to the prior art, JP 2004314258A may be mentioned, which describes how supporting pads may be provided in a drill body in the vicinity of asymmetrical cutting inserts mounted at the front end thereof. These support pads may be of different lengths, but they are all located in close proximity of the front end of the drill body.

The present invention aims at obviating the above-mentioned disadvantage of previously known short-hole drills and at providing an improved short-hole drill. Therefore, an object of the invention is to provide a short-hole drill, the tip or front end of which retains the desired centering also in connection with the same passing one or more hollow spaces inside a workpiece. In other words, the drill should generate optimally straight holes in spite of the hole wall being interrupted by transverse hollow spaces at one or more spots.

SUMMARY OF THE INVENTION

In an embodiment, the invention provides a short-hole drill, including a drill body being rotatable about a center axis and having a rotationally symmetrical envelope surface, one or more replaceable cutting inserts mounted in pockets in a front end of the drill body, one or more outwardly open flutes being countersunk in the envelope surface and extending rearwardly from the front end of the drill body to evacuate chips from the cutting inserts, and a number of replaceable first support pads being mounted in countersunk seats proximate the front end of the drill body to support and guide the drill against a hole wall generated by the cutting inserts. A number of second support pads are mounted in countersunk seats that are axially spaced apart from the first support pads by an envelope surface portion having a predetermined axial extension to support and guide the drill when the first support pads leave the hole wall.

In another embodiment, the invention provides a drill body for a short-hole drill, including a rotationally symmetrical envelope surface which is concentric with a center axis and in which one or more chip flutes are countersunk, the flutes extending rearwardly from a front end in which one or more pockets are formed that receive exchangeable cutting inserts, a number of seats that receive support pads being countersunk in the envelope surface and located proximate the front end, wherein a number of second seats that receive second support pads are countersunk in the envelope surface and are axially spaced apart from the first seats by an envelope surface portion having a predetermined axial extension.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 1 is a perspective view of a short-hole drill according to the invention;

FIG. 2 is a partial, perspective exploded view showing solely a front part of the drill, associated cutting inserts and support pads being shown separated from the proper drill body;

FIG. 3 is a partial perspective view showing the drill body rotated 180° in relation to the position according to FIG. 2, the cutting inserts and the support pads being shown in a mounted state;

DETAILED DESCRIPTION OF THE PREFERRED EMBODIMENTS

Figure 4:
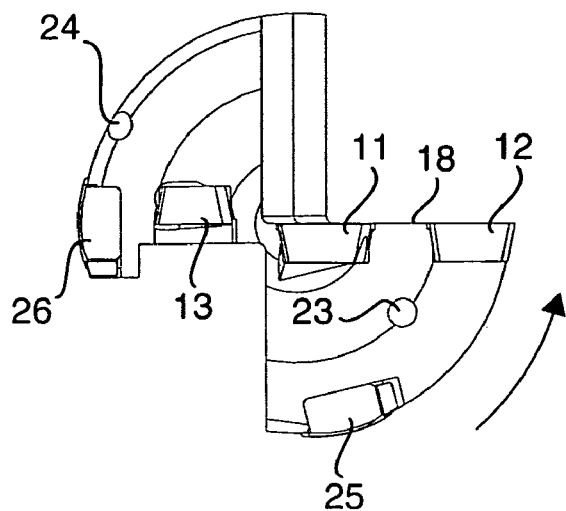
FIG. 4 is an enlarged end view A-A in FIG. 1.

In FIGS. 1-3, a short-hole drill is shown, which includes a drill body designated 1 in its entirety, as well as a number of detachable cutting inserts and support pads. The drill body 1 includes a long narrow shank 2 and a rear fixing part 3, which in this case is thicker than the shank 2. The drill body is rotatable around a center axis designated C. In the example, the fixing part 3 includes a rotationally symmetrical envelope surface 4 that is concentric with the axis C, and a planar surface 5, by means of which torque can be transferred to the drill from a driving machine (not shown).

The shank 2 may have a generally rotationally symmetrical, preferably cylindrical envelope surface 6. In the same, two chip flutes 7, 8 are countersunk, which in the example are straight and extend from the front end or tip 9 of the shank to a conical transition collar 10 between the shank and the fixing part.

In the shown embodiment, three replaceable cutting inserts are mounted at the front end 9 of the shank 2, one of which is a center insert 11, another one a peripheral cutting insert 12, and a third one an intermediate insert 13. The pockets in which the cutting inserts are mounted are illustrated in FIG. 2, and are designated 14, 15 and 16 respectively. The center and peripheral cutting inserts 11, 12 are mounted adjacent to chip flute 8, while the intermediate insert 16 is mounted adjacent to chip flute 7. The cutting inserts 11 and 12 remove chips in ring-shaped, inner and outer areas of the bottom of the hole, while the intermediate insert 13 removes chips in an overlapping ring formation between the inner and outer areas.

Figure 5:
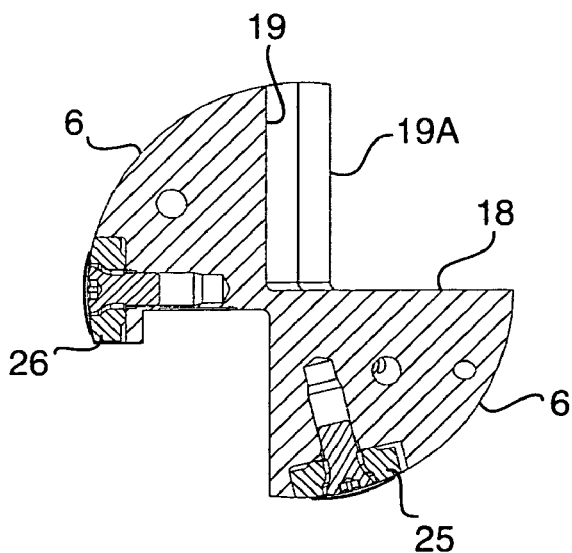
FIG. 5 is an enlarged cross-section B-B in FIG. 1.
Figure 6:
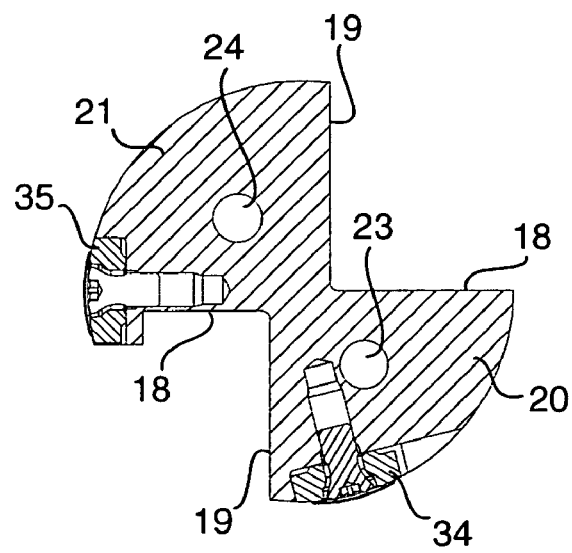
FIG. 6 is an enlarged cross section C-C in FIG. 1.

As illustrated in FIGS. 4-6, in this case the two chip flutes 7, 8 are cross section-wise V-shaped and individually delimited by a pair of planar limiting surfaces 18, 19 on bars 20, 21, each one of which has a sector-like or a wedge-of-a-circle-like cross section shape. The envelope surface 6 of these bars has a partially rotationally symmetrical, suitably cylindrical shape. Inside the bars 20, 21, there are through bores or channels 23, 24, which mouth in the front end of the drill and feed cooling liquid from behind towards the cutting inserts.

FIGS. 1-4, illustrate that the center and peripheral cutting inserts 11, 12 are mounted in pockets 14, 15 in the front surface 18 of the bar 20 that is movable forward in the direction of rotation (see the arrows in FIGS. 1 and 4), while the intermediate insert 13 is mounted on the bar 21, more precisely in a pocket 16 in the front surface 18 of the bar 21. During drilling, radial and tangential forces are applied to the two cutting inserts 11, 12, which forces totally are greater than the counteracting radial and tangential forces that act only on the intermediate insert 13 and the appurtenant bar 21 (the peripheral cutting insert 12 is situated at a greater radial distance from the center of the drill than the intermediate insert 13). This asymmetrical interaction of forces tends to deflect the front end of the drill. With the purpose of counteracting the same tendency and guiding the drill tip as straight as possible, a set of plates or pads 25, 26 are mounted in the envelope surface 6 of the bars 20, 21, which pads both are denominated support pads, but one of which, viz. the pad 25, fulfills the principal support function, while the other pad 26 foremost has a guiding function. As illustrated in FIG. 1, the support pads 25, 26 are situated in the immediate vicinity of the drill tip, i.e., in the same cross-section plane as the cutting inserts 11, 12, 13. The support pads are mounted in countersunk seats 27, 28 (see FIG. 2), which both open in the front-end surface of the drill and extend a short distance rearward from the same. In all essentials, the seats and the support pads are equally long. Fixation of the support pads is carried out by means of screws 29, which are tightened in screw holes 30 in the bottoms of the seats. Screws 29 have heads that are countersunk in an intermediate surface 31, which in turn is somewhat countersunk in relation to two axially separated contact or sliding surfaces 32. In this connection, it should be mentioned that the cutting inserts 11, 12, 13 are also fixed in the appurtenant pockets by means of conventional screws 33.

In solid drilling of simple, continuous holes in solid workpieces, the support pads 25, 26 fulfill the task as described above in a satisfying way, so far that the same in spite of the asymmetrical placement of the cutting inserts guide the drill tip substantially straight in the extension of the center axis C of the drill. However, if the drill tip is to pass a hollow space present in the interior of the workpiece, the dimensions of which are greater than the axial length of the support pads, then the support pads will lose their contact with the hole wall. The consequence of this may be that the front end of the drill is deflected and guided in a path that deviates from the ideal center line when the cutting inserts again are to be engaged into the material after having passed the hollow space.

In order to manage the above-mentioned problems and enable distinct drilling of straight holes in workpieces that include hollow spaces, in accordance with the invention, at least one additional set of support pads 34, 35 is arranged axially spaced apart from the front support pads 25, 26. The rear support pads 34, 35 may (but need not) be identical with the front support pads in respect of design and choice of material, as well as be fixable by means of screws having countersunk heads. The support pads 34, 35 are housed in seats 36, 37 that are countersunk in the envelope surface 6 and open sidewardly, the seats being somewhat longer than the support pads 34, 35. The individual seat 36, 37 is delimited by a bottom surface 38, two axially separated end surfaces 39, 40, as well as an axially oriented lateral support surface 41 which extends between the same and against which the side support surface of the support pad is pressable. It should be observed that the lateral support surface 41 is located behind the bottom surface 38 as viewed in the direction of rotation of the drill, the rest of the seat being, in this case, open forwardly in the direction of rotation. This means that not only one of the long-side edges of the support pad is reliably pressed against the lateral support surface 41, but also that the opposite long-side edge of the support pad is freely exposed forwardly in the direction of rotation. In such a way, it is guaranteed that the support pad is efficiently flushed over by the cooling liquid that is flushed obliquely rearward along the drill from the front tip.

As illustrated in FIG. 2, each rear seat 36, 37 is axially separated from the individual front seat 27, 28 via a material portion 44 along which the envelope surface 6 is unbroken. The length, i.e., the axial extension, of the material portion 44, varies depending on the size of the inner hollow space to be passed by the drill tip. The individual rear seat is situated linearly behind each front seat. In other words, the seats may be situated along a common, straight line that extends parallel to the center axis C.

In FIG. 3 and the other figures, it is seen that the bar 21 along the greater part of the length thereof is thicker than the part of the bar that is in the immediate vicinity of the drill tip. Thus, the planar limiting surface 19 transforms at the drill tip into a rear, planar limiting surface 19A via a curved transition surface 19B. This means that the chip flute 8 is wide in the immediate vicinity of the drill tip, but thinner along the limiting surface 19A. The effect of this is that the speed of the cooling liquid guaranteeing the evacuation of chips from the cutting inserts 11, 12 initially is moderate in order to subsequently increase considerably when the liquid passes the transition 19B to the narrower the flute section behind the same.

Figure 7:
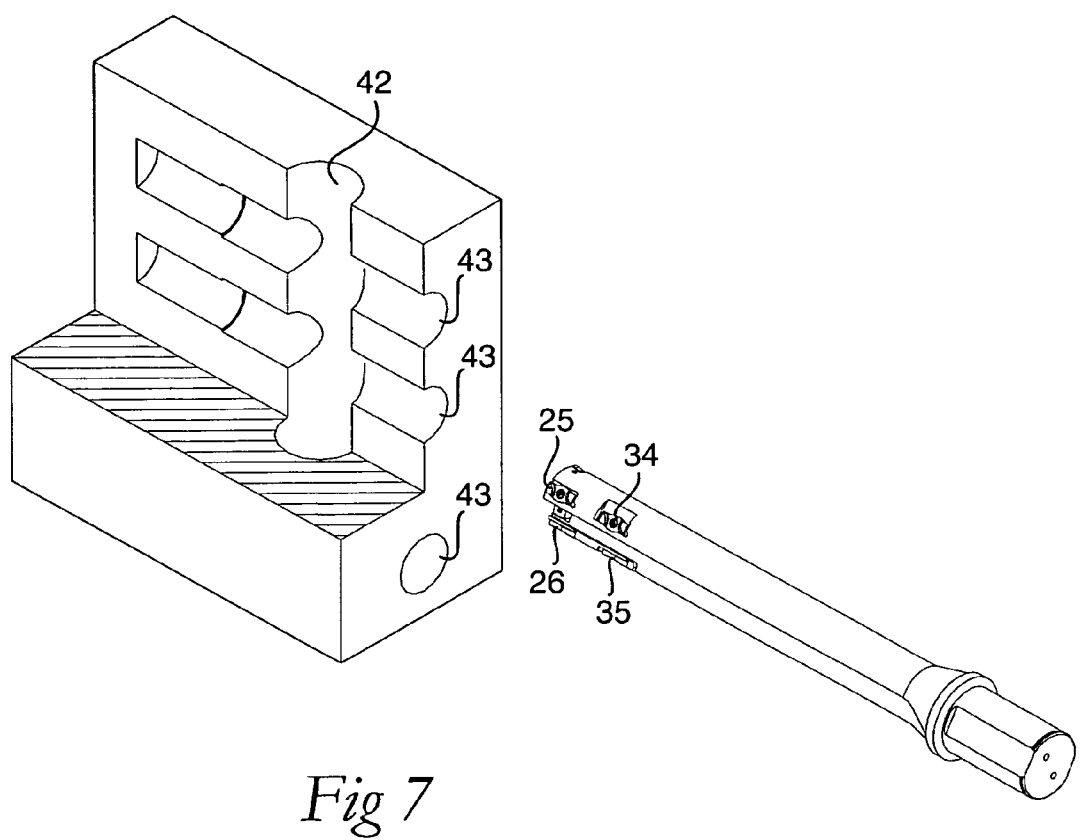
FIG. 7 is a schematic perspective view showing the drill according to the invention, as well as a workpiece during machining by the drill.

Reference is now made to FIG. 7, which schematically illustrates the use of the drill in connection with drilling in a workpiece having an inner hollow space. In this case, the hollow space is in the form of an already drilled hole 42, which is to be drilled through by a crossing hole 43 by means of the drill. The drilled hole 42 is assumed to have a diameter that is greater than the drill diameter and also greater than the axial length of the front support pads 25, 26. When the tip of the drill during drilling of the individual hole 43 reaches up to and is inserted into the already drilled hole 42, the front support pads 25, 26 will lose their contact with the hole wall being behind. At this stage, the supporting and guiding function of the front support pads 25, 26 is taken over by the rear support pads 34, 35, which are so far spaced apart from the drill tip that they retain the contact thereof with the hole wall until the cutting inserts again engage the material, i.e., the material that is present on the opposite side of the hole 42. In such a way, the drill tip is centered in a reliable way during the engagement phase until the front support pads 25, 26 have recovered the supporting and guiding function thereof. Although only a single crossing hole or hollow space is shown in FIG. 7, the drill of course may also pass an additional number of hollow spaces.

While the invention has been disclosed with reference to certain preferred embodiments, numerous modifications, alterations, and changes to the described embodiments are possible without departing from the sphere and scope of the invention, as defined in the appended claims and their equivalents thereof. For example, in the embodiment shown in the drawings, the replaceable support pads are assumed to be composed of conventional plates of a wear-resistant material, such as cemented carbide. However, within the scope of the invention, it is also feasible to use other types of support pads, e.g., of wear-resistant plastic. In doing so, the rear support pad or pads may differ from the front, conventional support pads in respect of shape as well as placement. For instance, the rear support pads need not necessarily be located linearly behind the front ones, but be displaced peripherally in relation to the same. Within the scope of the invention, instead of support pads, the axial placement of which along the drill body is determined once and for all, it is also possible to arrange support pads that are axially adjustable in different positions along the drill body. For this purpose, the drill body may be formed with longitudinal, countersunk guides along which individual support pads can be displaced and fixed in the desired positions. Although only two support pads in each set have been shown in the example, the number of pads in the individual set may vary. In the embodiment shown in the drawings, the invention has been exemplified in the context of a short-hole drill having asymmetrical cutting inserts, which require a front set of support pads. However, the invention is also applicable to short-hole drills having symmetrical cutting inserts or insert bodies, the peripheral portions of the proper insert body guaranteeing the supporting and guiding function against the hole wall. Also such drills, e.g., posthole augers, may advantageously be made with one or more secondary control functions to guide the drill tip when the same passes a hollow space and loses contact with the hole wall. Furthermore, it should be pointed out that the invention is applicable not only to drills having straight chip flutes, but also to so-called twist drills having helicoidal chip flutes. In the embodiment shown in the drawings, the shank and fixing part of the drill body are made integrally, preferably of steel (also other materials, such as cemented carbide, are feasible). However, this does not prevent that the shank and the fixing part are manufactured in the form of separate units, which permanently are united to each other in a suitable way, e.g., by laser welding. In an embodiment of the invention, the individual rear seat for a rear support pad may be deeper (i.e. situated closer to the center axis C) than the co-operating seat for a forward support pad so as to allow the insertion of a thin shim or leaf between the bottom of the rear end seat and the rear support pad. By properly selecting the thickness of the shim, the top surface of the rear support pad may be exactly levelled with the top surface of the forward support pad irrespective of any irregularities of the form of the drill body between the ends thereof. The thickness of such shims may vary, e.g. in the range of 0.01-0.20 mm. Accordingly, it is intended that the invention not be limited to the described embodiments, but that it have the full scope defined by the language of the following claims.

What is claimed is:

1. A short-hole drill, comprising a drill body being rotatable about a center axis and having a rotationally symmetrical envelope surface, one or more replaceable cutting inserts mounted in pockets in a front end of the drill body, one or more outwardly open flutes being countersunk in the envelope surface and extending rearwardly from the front end of the drill body to evacuate chips from the cutting inserts, and a number of replaceable first support pads being mounted in countersunk seats proximate the front end of the drill body to support and guide the drill against a hole wall generated by the cutting inserts, at least one of the countersunk seats opening toward a respective flute, wherein a number of second support pads mounted in countersunk seats are axially spaced apart from the first support pads by an envelope surface portion having a predetermined axial extension to support and guide the drill when the first support pads leave the hole wall.

2. The short-hole drill according to claim 1, wherein a second support pad is located linearly behind a first support pad.

3. A drill body for a short-hole drill, comprising a rotationally symmetrical envelope surface which is concentric with a center axis and in which one or more chip flutes are countersunk, the flutes extending rearwardly from a front end in which one or more pockets are formed that receive exchangeable cutting inserts, a number of seats that receive support pads being countersunk in the envelope surface and located proximate the front end, at least one of the seats opening toward a respective flute, wherein a number of second seats that receive second support pads are countersunk in the envelope surface and are axially spaced apart from the first seats by an envelope surface portion having a predetermined axial extension.

4. The drill body according to claim 3, wherein a second seat is located linearly behind a first seat.

5. A short-hole drill, comprising:
a drill body being rotatable about a center axis and having an envelope surface;
at least one replaceable cutting insert mounted in a pocket in a front end of the drill body;
at least one outwardly open flute being countersunk in the envelope surface and extending rearwardly from the front end of the drill body to evacuate chips from the cutting insert;
at least one replaceable first support pad being mounted in a countersunk seat proximate the front end of the drill body to support and guide the drill against a hole wall generated by the cutting insert, the countersunk seat opening toward the at least one flute; and
at least one second support pad mounted in a countersunk seat axially spaced apart from the first support pad by an envelope surface portion having a predetermined axial extension to support and guide the drill when the first support pad leaves the hole wall.

6. The short-hole drill according to claim 5, wherein the at least one outwardly open flute is a straight flute.

7. A drill body for a short-hole drill, comprising a rotationally symmetrical envelope surface which is concentric with a center axis and in which one or more chip flutes are countersunk, the flutes extending rearwardly from a front end in which one or more pockets are formed that receive exchangeable cutting inserts, a number of seats that receive support pads being countersunk in the envelope surface and located proximate the front end, wherein a number of second seats that receive second support pads are countersunk in the envelope surface and are axially spaced apart from the first seats by an envelope surface portion having a predetermined axial extension, at least one of the second seats being longer in the direction of the center axis than a respective second support pad.

8. A short-hole drill, comprising:
a drill body being rotatable about a center axis and having an envelope surface;
at least one replaceable cutting insert mounted in a pocket in a front end of the drill body;
at least one outwardly open flute being countersunk in the envelope surface and extending rearwardly from the front end of the drill body to evacuate chips from the cutting insert;
at least one replaceable first support pad being mounted in a countersunk seat proximate the front end of the drill body to support and guide the drill against a hole wall generated by the cutting insert; and
at least one second support pad mounted in a countersunk seat axially spaced apart from the first support pad by an envelope surface portion having a predetermined axial extension to support and guide the drill when the first support pad leaves the hole wall, the seat being longer in the direction of the center axis than a respective second support pad.

* * * * *